(12) United States Patent
Nagano et al.

(10) Patent No.: US 6,287,467 B1
(45) Date of Patent: Sep. 11, 2001

(54) SUBMERGED MEMBRANE CARTRIDGE

(75) Inventors: Masaaki Nagano; Yasunobu Okajima; Yutaka Yamada; Kiyoshi Izumi; Tatsuya Uejima, all of Osaka (JP)

(73) Assignee: Kubota Corporation (JP)

( * ) Notice: Subject to any disclaimer, the term of this patent is extended or adjusted under 35 U.S.C. 154(b) by 0 days.

(21) Appl. No.: 09/544,064

(22) Filed: Apr. 6, 2000

(30) Foreign Application Priority Data

Feb. 4, 2000 (JP) .................................................. 12-026887

(51) Int. Cl.$^7$ ........................... B01D 63/08; B01D 69/06; B01D 29/05

(52) U.S. Cl. .................... 210/321.84; 210/232; 210/455; 210/483

(58) Field of Search .............................. 210/321.6, 321.75, 210/321.84, 455, 232, 483, 496

(56) References Cited

U.S. PATENT DOCUMENTS 4,952,317 * 8/1990 Culkin .................................. 210/636
5,624,556 * 4/1997 Kutowy et al. .................. 210/321.75

* cited by examiner

Primary Examiner—John Kim
(74) Attorney, Agent, or Firm—Mark Kusner

(57) ABSTRACT

Provided is a submerged membrane cartridge which comprises a supporting plate made of a resin, and a membrane disposed so as to cover the surface of the supporting plate, and is characterized in that the membrane is fused in a plurality of welding allowances formed in multiple, along the entire periphery of the supporting plate; an inner fixing portion that retains the membrane under tension is formed by an inner welding allowance; a water sealing portion that ensures a sealing function through the entire periphery of the membrane is formed by a central welding allowance; and an outer fixing portion that fixes the periphery of the membrane to the supporting plate is formed by an outer welding allowance.

4 Claims, 21 Drawing Sheets

SUBMERGED MEMBRANE CARTRIDGE

FIELD OF THE INVENTION

The present invention relates to a submerged membrane cartridge and a method of manufacturing the same and to a technique of membrane cartridges installed on to solid-liquid separation unit used in domestic or industrial wastewater treatment.

BACKGROUND OF THE INVENTION

As a conventional solid-liquid separation unit, there is, for example, a submerged membrane unit as shown in FIG. 15. Referring to FIG. 15, in a membrane unit 21, a plurality of plate-like membrane cartridges 22, and a diffuser 23 that flows a membrane surface cleaning air from the bottom of the membrane cartridges 22, are disposed in a case 24. The case 24 consists of a membrane case 25 and a diffuser case 26, and it is designed so that the entire air dispersed from the diffuser 23 to clean membrane surface enters into the membrane case 25.

In the membrane cartridge 22, a membrane 22B is disposed on both surfaces of a supporting plate 22A made of ABS resin, and the membranes 22B are sealed, at a water sealing portion S of the periphery, to the supporting plate 22A by supersonic welding. A permeate passage is formed between the supporting plate 22A and membrane 22B, and inside of the supporting plate 22A, and a nozzle 22C connected to the permeate passage is formed at an upper edge of the supporting plate 22A.

Each membrane cartridge 22 is connected, via a tube 27 connected to the nozzel 22C, to a manifold 28. A permeate discharge pipe 29 that discharges the liquid transmitted through the membrane is connected to the manifold 28.

When a membrane unit 21 is used in an activated sludge treatment plant, the membrane unit 21 is submerged in a mixed liquor of activated sludge in an aeration tank, organic substances and nitrogen in raw water are treated with the activated sludge, under the condition that an aerated air is dispersed from an diffuser 23.

The mixed liquor of activated sludge is subjected to gravity filtration by the membrane cartridges 22 by using the water head in the aeration tank as a driving pressure (alternatively, a suction filtration may be conducted by interposing a suction pump in a permeate discharge pipe 29), and the permeate through the membrane surface of the membrane cartridges 22 is discharged, as a treated water, via the permeate discharge pipe to the outside of the tank.

At this time, the bubble swarm dispersed from the diffuser 23, and an upward current caused by the bubbling will flow a narrow watercourse (5 to 10 mm in width) between the adjacent membrane cartridges 22. Thereby, the membrane surfaces of the membrane cartridges 22 are cleaned to suppress a separation function reduction, thereby preventing a malfunction of the membrane unit 21.

Thus, since the membrane cartridge 22 is subject to an upwelling current caused by the aeration air when the membrane unit 21 is in use, the region surrounded by the water sealing portion S and the peripheral part of the membrane 22B will vibrate, and the membrane 22B might be broken at the water sealing portion S due to fatigue. Therefore, as shown in FIG. 16, it has been proposed to fix auxiliary the membrane 22B to the supporting plate 22A at a peripheral fixing portin B to be formed intermittently along the peripheral part of the membrane 22B.

One of ultrasonic welding processes is a rotary welding. In this process, as shown in FIG. 17, a membrane 22B is disposed so as to cover the surface of a supporting plate 22A, a rotary horn 31 is rotated while it presses the membrane 22B against the supporting plate 22A and, by the ultrasonic generated from the rotary horn 31, the membrane 22B is sealed to the supporting plate 22A, thereby to form a water sealing portion S and auxiliary fixing portion B.

With the rotary welding process, however, the supporting plate 22A is melted at the water sealing portion S, to make a dent in the form of a groove, as shown in FIG. 18. Since the membrane 22B is sealed to the supporting plate 22A so as to bite into the plate 22A, the membrane 22B is damaged at the time of welding, which is susceptible to a fatigue failure.

Other example of the ultrasonic welding processes is an up-down process. In this process, as shown in FIGS. 19 to 21, a linear welding allowance 32 and zonal auxiliary welding allowance 33 for forming a water sealing portion S are previously formed on the surface of a supporting plate 22A, so as to project therefrom, a membrane 22B is disposed so as to cover the welding allowance 32 and auxiliary welding allowance 33, and an up-down horn 34 is pressed against the welding allowances 32 and 33, from above the membrane 22B.

The up-down horn 34 has, on its bottom facing to the membrane 22B, a pattern 34a. The pattern 34a is formed in such a manner that 0.3-mm-high regular quadrangular pyramids are positioned from one another by a pitch of 0.6 mm.

By the ultrasonic vibration generated from the up-down horn 34, the membrane 22B is sealed to the supporting plate,22A at the welding allowances 32 and 33, to form a linear water sealing portion S and auxiliary fixing portion B.

Meanwhile, the membrane 22B is obtained by forming an organic substance on the front and rear surfaces of a nonwoven fabric serving as a substrate. Its mechanical strength is ensured by the nonwoven fabric. Therefore, in the foregoing method, the membrane 22B is locally pressed at the position corresponding to the top of the pattern 34a of the up-down horn 34, and an excessive energy is concentrated at that position. Thereby, the fabric of the nonwoven fabric is easily broken and its mechanical strength is thus impaired.

It is a primary object of the invention to provide a submerged membrane cartridge having an improved durability against aeration, as well as a method of manufacturing the same.

DISCLOSURE OF THE INVENTION

To achieve the foregoing object, and in accordance with the present invention, there is provided a submerged membrane cartridge comprising a supporting plate made of a resin, and a membrane disposed so as to cover the surface of the supporting plate, characterized in that the membrane is fused in a plurality of welding allowances formed, in multiple, along the periphery of the supporting plate; an inner fixing portion that retains the membrane under tension is formed by an inner welding allowance; a water sealing portion that ensures a sealing function through the entire periphery of the membrane is formed by a central welding allowance; and an outer fixing portion that fixes the periphery of the membrane to the supporting plate is formed by an outer welding allowance.

With this construction, the submerged membrane cartridge is submerged in a reaction tank and used in the state that an aeration is made from the bottom. In this state, a gas-liquid-solid mixed phase upward flow that is derived from the aeration will flow along the membrane surface. Therefore, the vibration caused by the gas-liquid-solid mixed phase upward flow is exert on the submerged membrane cartridge. The service environment of the submerged membrane cartridge in the reaction tank is varied depending on the shape of the reaction tank, the property of a liquid treated that is stored in the reaction tank, seasonal variable factors, and the like. Thus, depending on the change in the service environment, an eventual external force might be exerted on the submerged membrane cartridge.

The inner fixing portion that retains the membrane under tension, and the outer fixing portion that fixes the periphery of the membrane to the supporting plate, have a sufficient strength to the external force exerted on the membrane in the usual service condition. Therefore, by receiving an external force at the inner fixing portion and the outer fixing portion, no external force reaches the water sealing portion, thus preventing damage to the water sealing portion.

By the presence of the inner fixing portion and outer fixing portion, each acting as a protector against an external force, even when the membrane peels at the inner or outer fixing portion, because of vibration fatigue and eventual external force, the water sealing portion does not peel at the same time. It is therefore able to prevent the filtration performance of the submerged membrane cartridge from being damaged at an eventual circumstance. Thereby, the submerged membrane cartridge has an improved durability against aeration.

When a peeling occurs in the inner fixing portion or the outer fixing portion, the former or later is repaired to recover its protecting function, in order to prevent the peeling of the water sealing portion. This permits to extend the life of the submerged membrane cartridge.

Preferably, the outer fixing portion is shaped like a mesh.

With this construction, since the periphery of the membrane is sealed at the outer fixing portion having a predetermined width, the dimensional errors of the membrane and supporting plate can be cancelled at the outer fixing portion.

Preferably, the membrane is fused through its entire periphery to the supporting plate, in the inner fixing portion, water sealing portion and outer fixing portion.

With this construction, its sealing function can be ensured in multiple.

Preferably, the membrane is formed by providing an organic membrane on the front and rear surfaces of a membrane substrate made of a nonwoven fabric, and a fusing layer reaching the top layer on the welding surface side of the membrane substrate is formed in the inner fixing portion, water sealing portion and outer fixing portion.

With this construction, in the event that the membrane peels at the inner or outer fixing portion, due to vibration fatigue and eventual external force, the membrane separates from the inner or outer fixing portion, without causing a breakage of the membrane substrate. This facilitates to repair the membrane.

According to the invention, there is also provided a method of manufacturing a submerged membrane cartridge which comprises: forming, on a supporting plate made of a resin, a plurality of linear welding allowances and a mesh-like welding allowance located outside of the linear welding allowances, so as to project from the surface of the supporting plate, and, along the periphery of the supporting plate; disposing a membrane on the surface of the supporting plate, so as to cover each linear welding allowance and the mesh-like welding allowance; pressing an up-down horn, on its flat surface, against each liner welding allowance and mesh-like welding allowance, from above the membrane; fusing the membrane in each linear welding allowance and mesh-like welding allowance by using ultrasonic vibration of the up-down horn; retaining the membrane under tension by a linear inner fixing portion formed in an inner linear welding allowance; ensuring a sealing function through the entire periphery of a water sealing portion formed in a central linear welding allowance; and fixing intermittently the periphery of the membrane to the supporting plate by a mesh-like fixing portion formed in an outer mesh-like welding allowance.

These and other objects, features, aspects and advantages of the present invention will become more apparent from the following detailed description of the present invention when taken in conjunction with the accompanying drawings.

EMBODIMENTS

Figure 15:
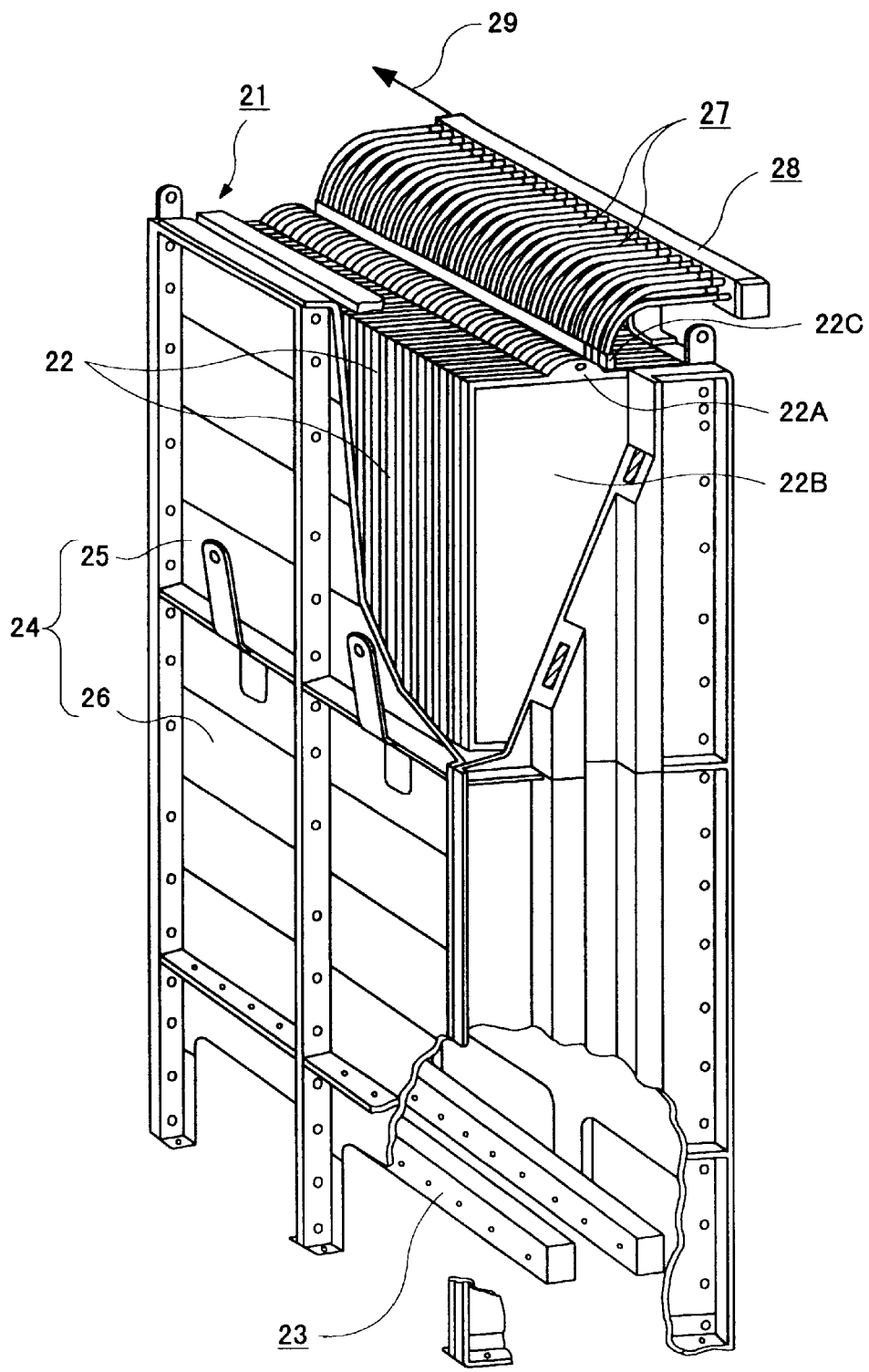
FIG. 15 is a perspective view of a conventional membrane unit.
Figure 16:
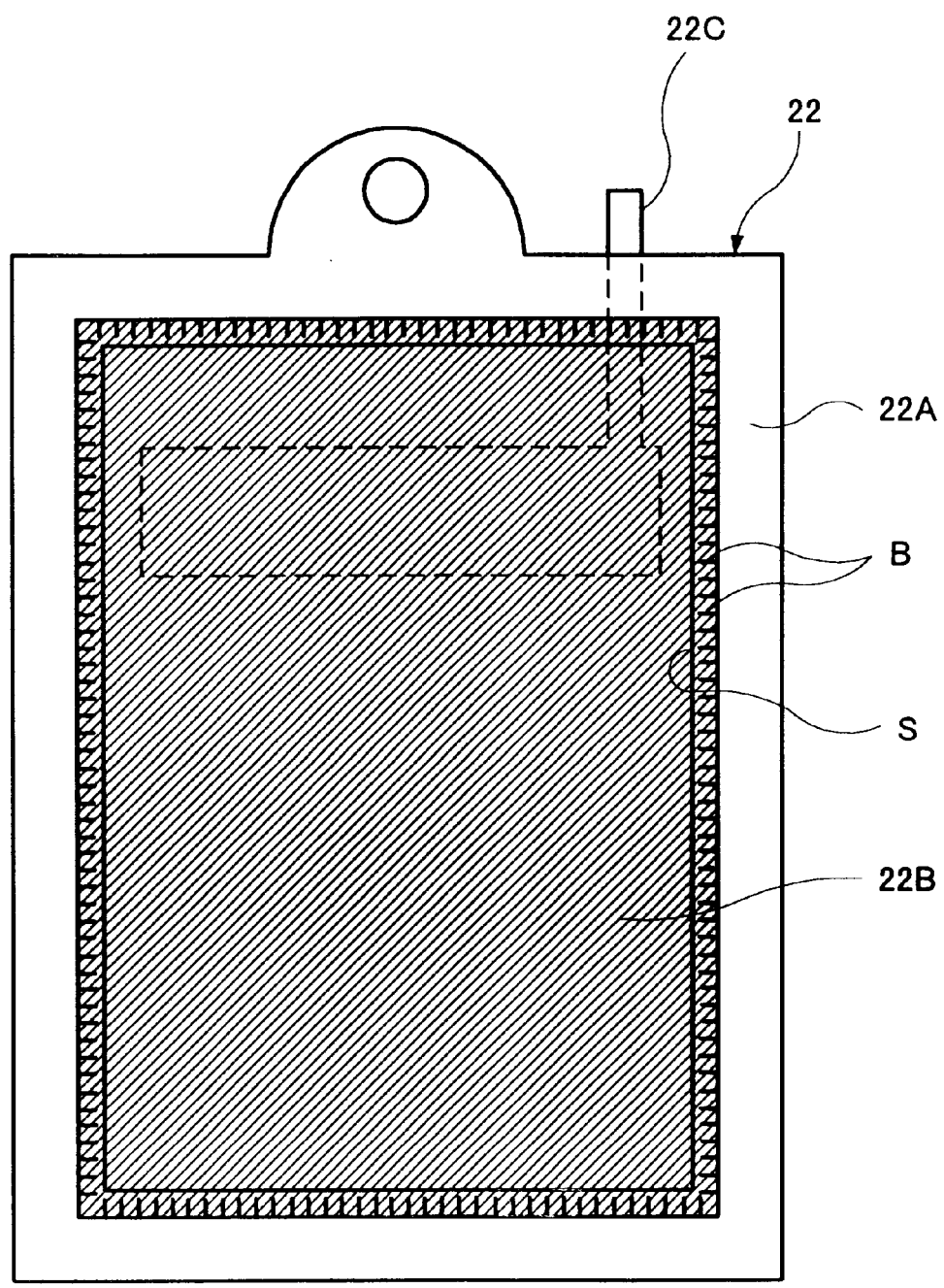
FIG. 16 is a schematic diagram of a conventional membrane cartridge.
Figure 17:
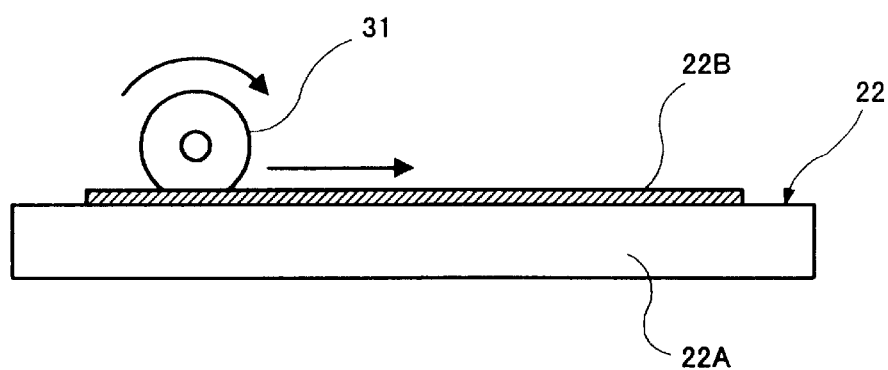
FIG. 17 is a schematic diagram illustrating a conventional method of manufacturing a membrane cartridge.
Figure 18:
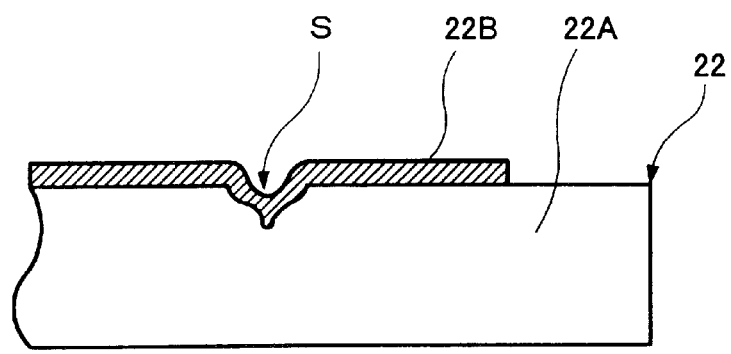
FIG. 18 is a cross section of a conventional membrane cartridge.
Figure 19:
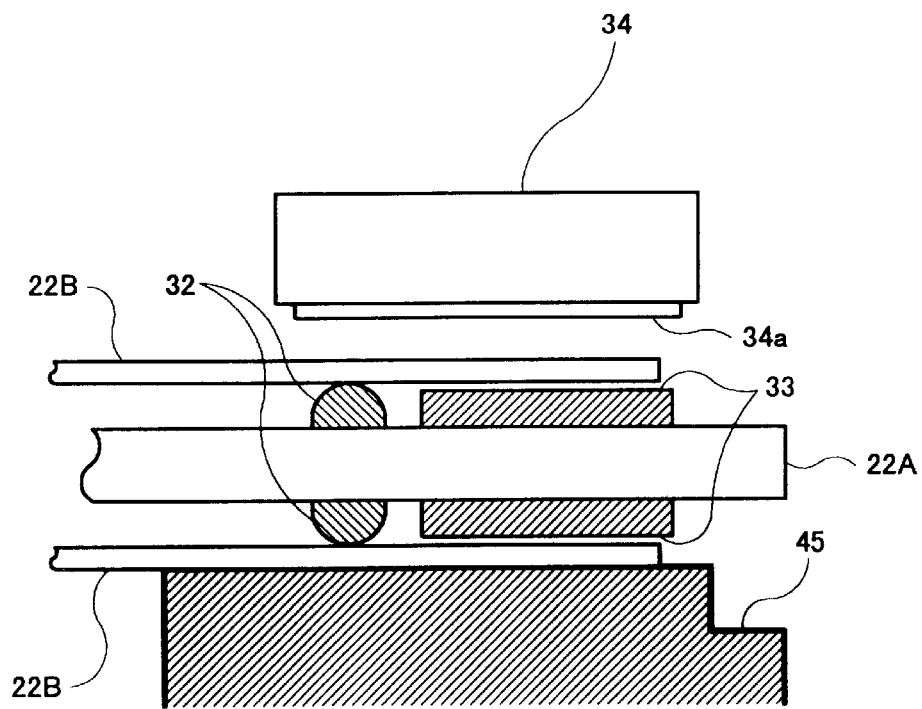
FIG. 19 is a schematic diagram illustrating a conventional method of manufacturing a membrane cartridge.
Figure 20:
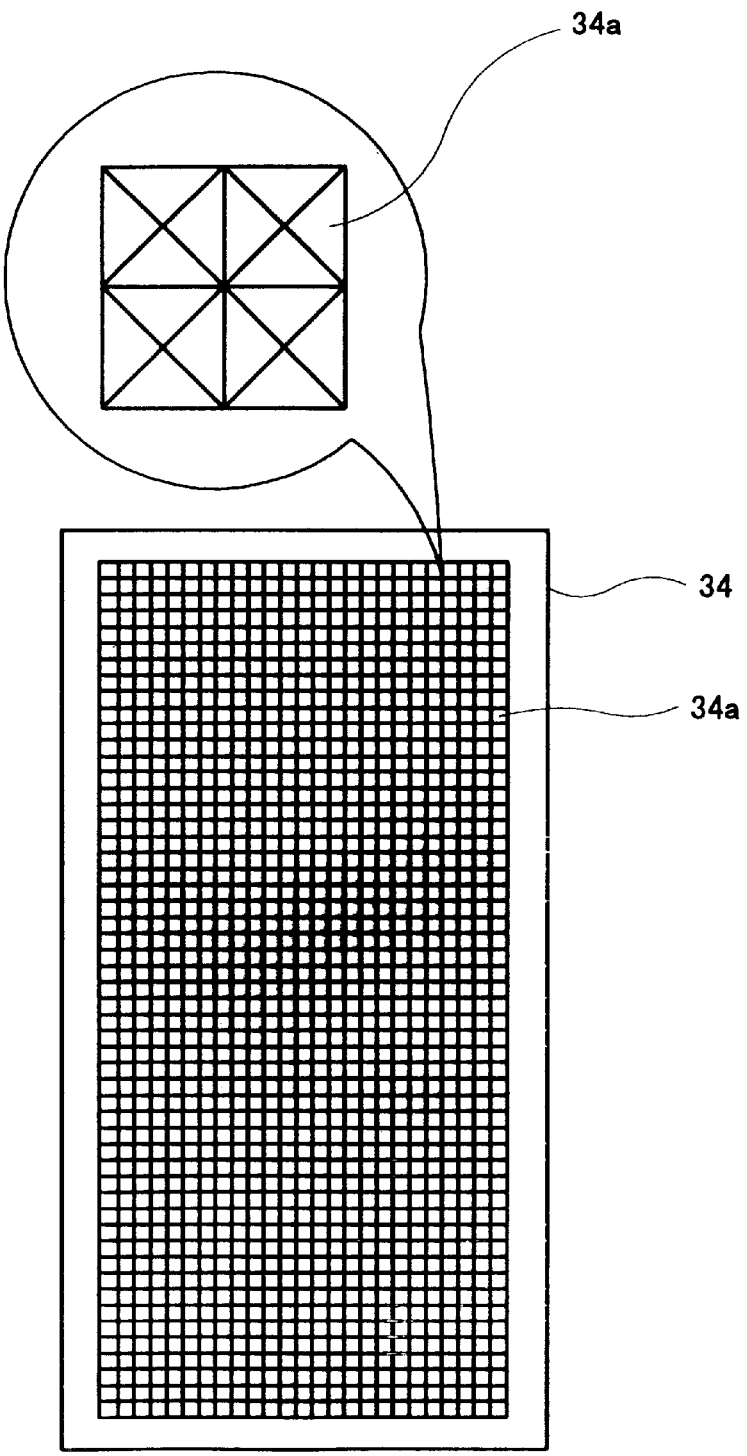
FIG. 20 is a schematic diagram of a pattern part of conventional up-down horn.
Figure 21:
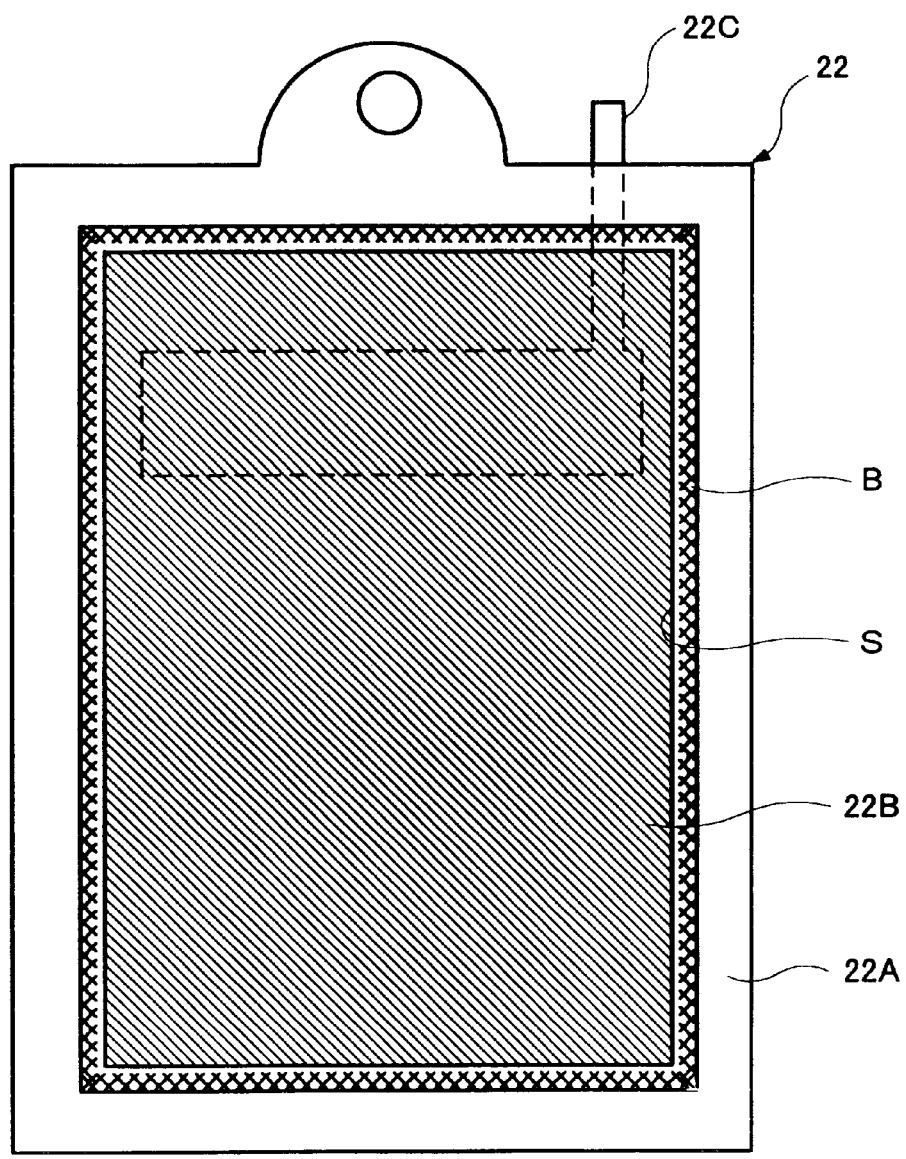
FIG. 21 is a schematic diagram of a conventional membrane cartridge.

Preferred embodiments of the invention will be described below by referring to the accompanying drawings. A submerged membrane cartridge in one preferred embodiment is for use in an submerged membrane unit. The basic structure of the membrane unit is the same as that previously described by referring to FIG. 15. Therefore, like parts are identified by the same reference numerals as in FIG. 15, and its description is omitted.

A method of manufacturing a submerged membrane cartridge of the preferred embodiment will be described by referring to FIGS. 1 to 4.

Figure 2:
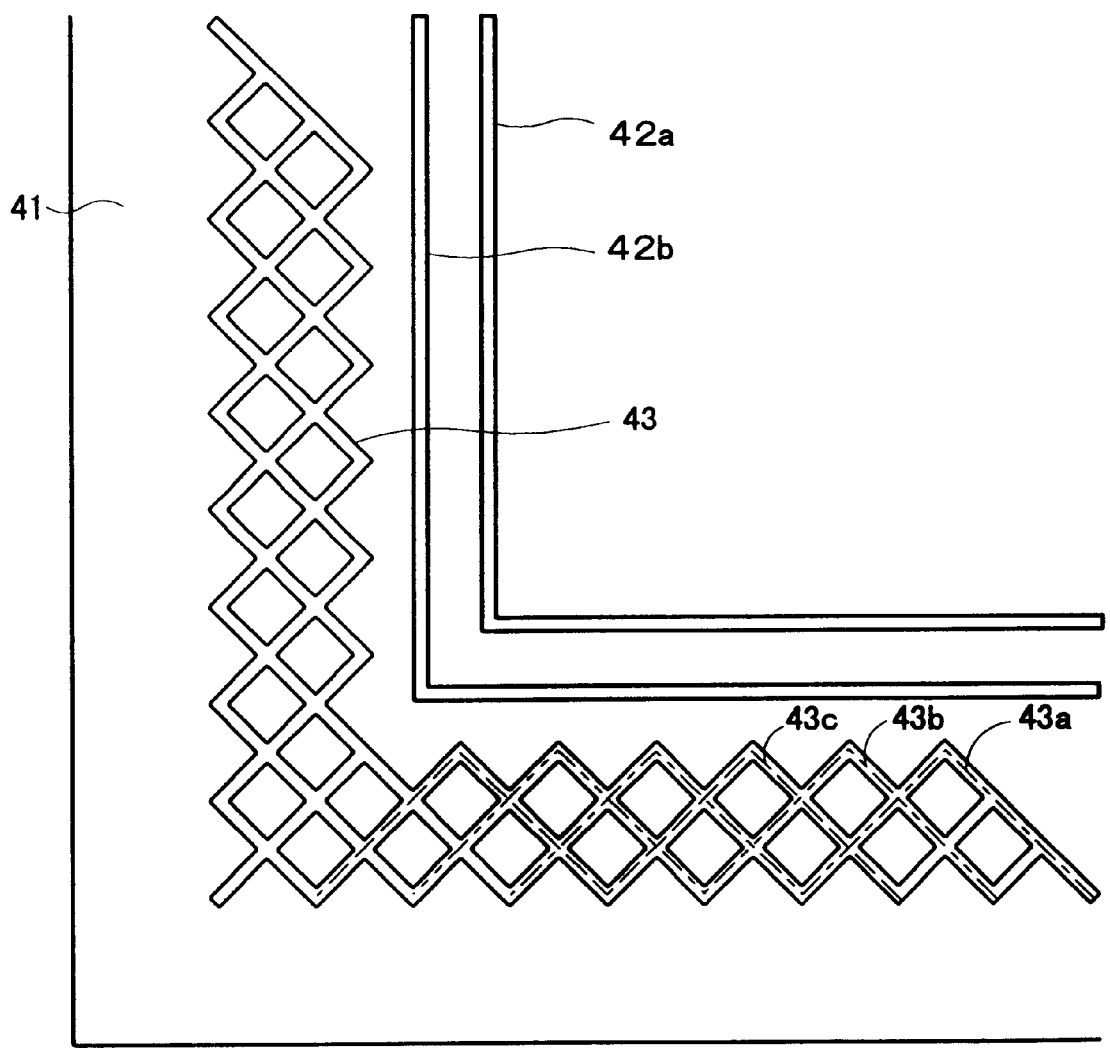
FIG. 2 is a schematic diagram of a supporting plate in the embodiment.

Referring to FIG. 2, a supporting plate 41 of a submerged membrane cartridge 40 is composed of an ABS resin, and it has a shape of 490 mm wide, 1000 mm long, and 6 mm high. A liner welding allowance 42a located at an inner side, a linear welding allowance 42b located at the center, and a mesh-like welding allowance 43 having a predetermined width located at an outer side, and formed so as to project from the front and rear surfaces of the supporting plate 41, and are integrally formed through the entire periphery along the periphery of the supporting plate 41.

The linear welding allowances 42a and 42b have a height in the range of 0.4 to 0.6 mm. The mesh-like welding allowance 43 corresponds to the periphery of the membrane 44, and is lower than the linear welding allowances 42a and 42b by the amount of about 0.1 mm. The welding allowance 43 is formed by overlapping three irregular-line trails 43a, 43b and 43c.

Figure 3:
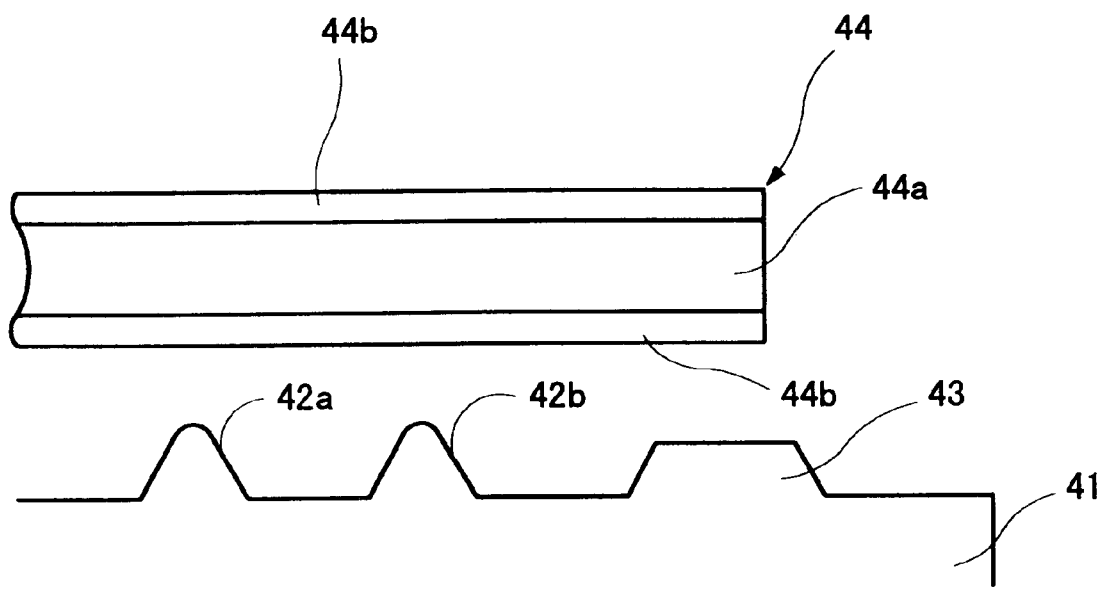
FIGS. 3 and 4 are schematic diagrams illustrating a sequence in manufacturing the membrane cartridge in the embodiment.

Referring to FIG. 3, a membrane 44 is disposed on the front and rear surfaces of the supporting plate 41, so as to cover the linear welding allowances 42a, 42b and the mesh-like welding allowance 43. The membrane 44 is formed by providing an organic membrane 44b on the front and rear of a substrate 44a composed of a nonwoven fabric.

Figure 4:
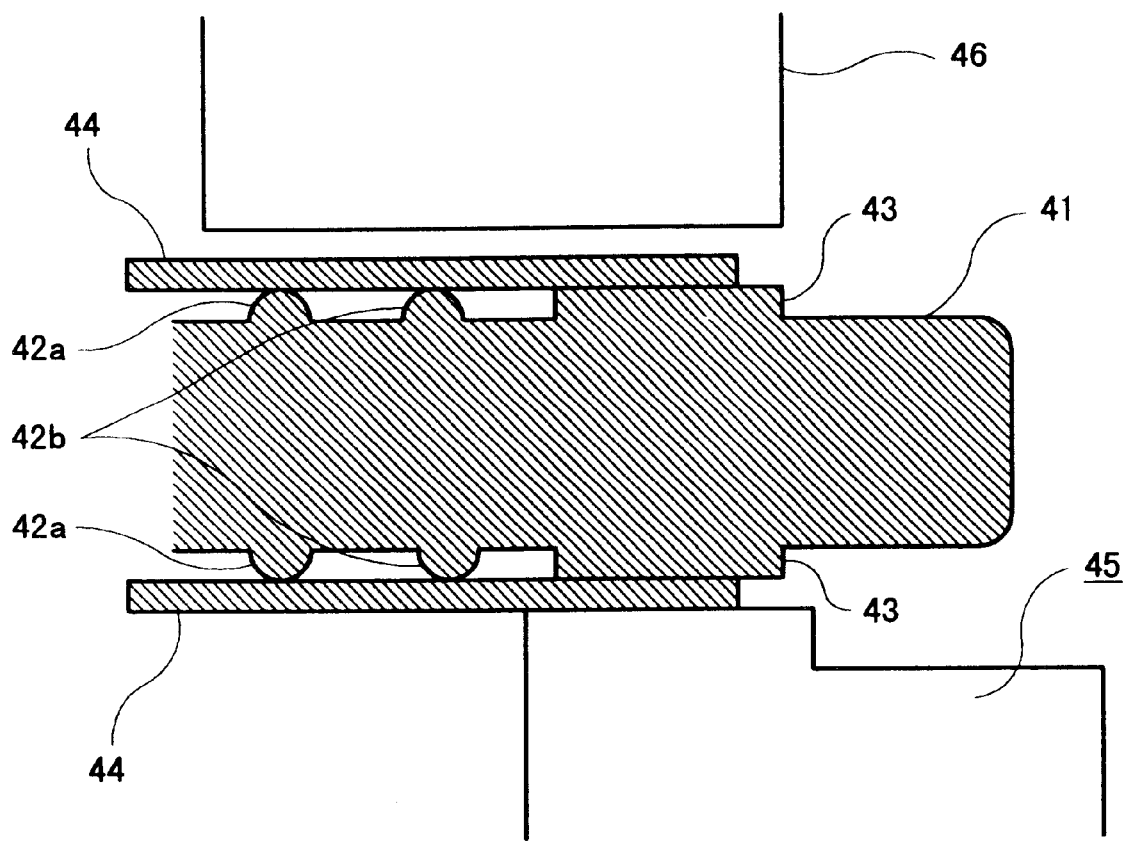

Referring to FIG. 4, the supporting plate 41 provided with the membrane 44 is disposed on a fixture 45, and the mesh-like welding allowance 43 underlying the supporting plate 41 is supported by the fixture 45, with the membrane 44 interposed. In this state, from above the membrane 44 overlying the supporting plate 41, an up-down horn 46 is pressed against the liner welding allowances 42a and 42b, and the mesh-like welding allowance 43.

The up-down horn 46 causes ultrasonic vibration, and its bottom surface facing to the membrane 44 forms a flat surface.

By vibrating the up-down horn 46 using a ultrasonic, the membrane 44 is fused at the linear welding allowances 42a, 42b and the mesh-like welding allowance 43. At that time, since the mesh-like welding allowance 43 is lower than the linear welding allowances 42a and 42b, the membrane 44 is sandwiched by the up-down horn 46 and the linear welding allowances 42a and 42b, on the top surface of the supporting plate 41, and the membrane 44 has no contact with the mesh-like welding allowance 43. Therefore, in the linear welding allowances 42a and 42b, a fusion occurs between the membrane 44 and supporting plate 41, thereby providing a sufficiently strong welding. In the mesh-like welding allowance 43, a fusion occurs only at a high position, which is caused by an error in height. on the other hand, on the rear surface of the supporting plate 41, since the membrane 44 is sandwiched between the fixture 45 and the mesh-like welding allowance 43, the fusion between the membrane 44 and supporting plate 41 is limited to the mesh-like welding allowance 43, thereby providing a sufficiently strong welding. After the fusion, the supporting plate 41 having the membrane 44 is reversed so that it is disposed on the fixture 45 again, and a welding is conducted again in the same procedure.

Figure 12:
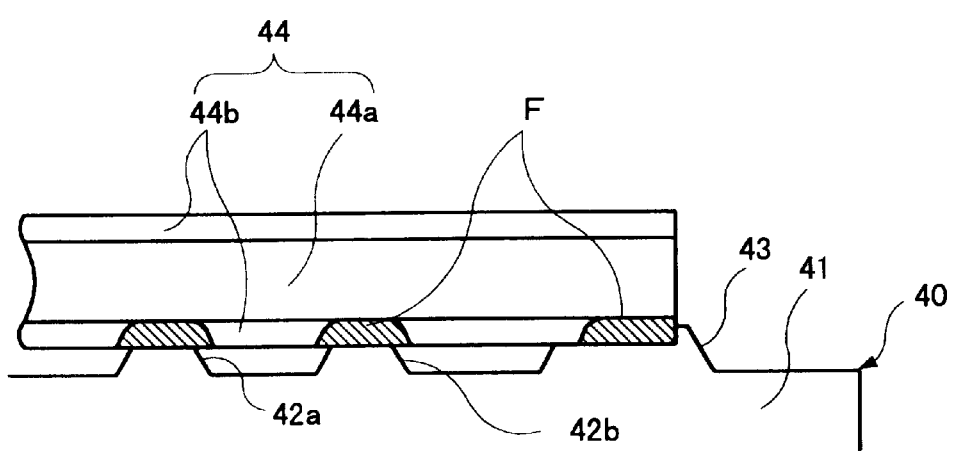
FIG. 12 is a schematic diagram illustrating an ideal welded state of the membrane.
Figure 13:
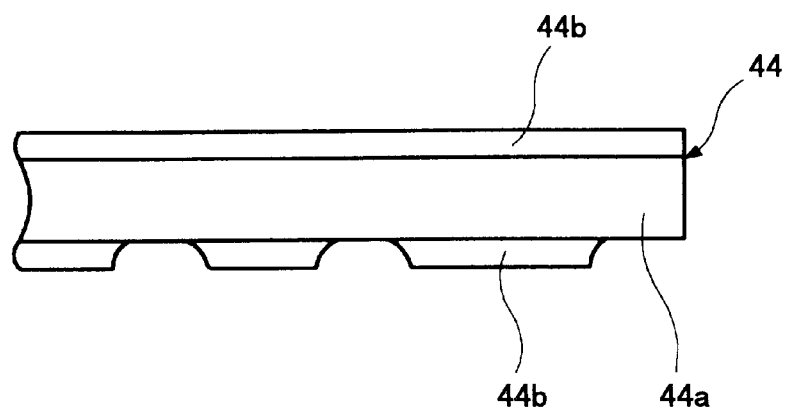
FIG. 13 is a schematic diagram illustrating a case that the membrane is peeled in an ideal welded state.

In the above fusion processing, as shown in FIG. 12, a fusing layer F reaching the top layer on the welding surface side of a membrane substrate 44a is formed at an inner fixing portion A, water sealing portion S, and outer fixing portion C. Therefore, the pressure (0.2 to 0.6 MPa), amplitude (30 to 60 μm) and oscillation time (0.1 to 0.5 sec.) of the up-down horn 46 are set.

Thus, by using the up-down horn 46 with a flat surface, the membrane 44 is fused in the linear welding allowances 42a, 42b and the mesh-like welding allowance 43, each projecting from the surface of the supporting plate 41, thereby to form the inner fixing portion A, the water sealing portion S and the outer fixing portion C. This construction enables to prevent the membrane 44 from being deteriorated due to an excess energy concentration, and to prevent the occurrence of knurling flaw as has been conventional.

Meanwhile, the wide mesh-like welding allowance 43 tends to have an irregular height. Therefore, when the flat surface of the up-down horn 46 presses against the linear welding allowances 42a and 42b and the mesh-like welding allowance 43 at the same time, a fusing layer F of the outer fixing portion C in the mesh-like welding allowance 43 will become insufficient and thus discontinuous, alternatively, a fusing layer F of the inner fixing portion A and water sealing portion S in the linear welding allowances 42a and 42b will becomes excessive. As a result, it is difficult to form an appropriate fusing layer F in the inner fixing portion A, water sealing portion S and outer fixing portion C, at the same time.

However, an appropriate fusing layer F can be formed in the inner fixing portion A, water sealing portion S and outer fixing portion C by performing a suitable welding according to the characteristic of each welding allowance by using the linear welding allowances 42a, 42b and the mesh-like welding allowance 43 which have different heights one another, and by performing a fusing procedure of the front and rear of the supporting plate 41, respectively.

Figure 1:
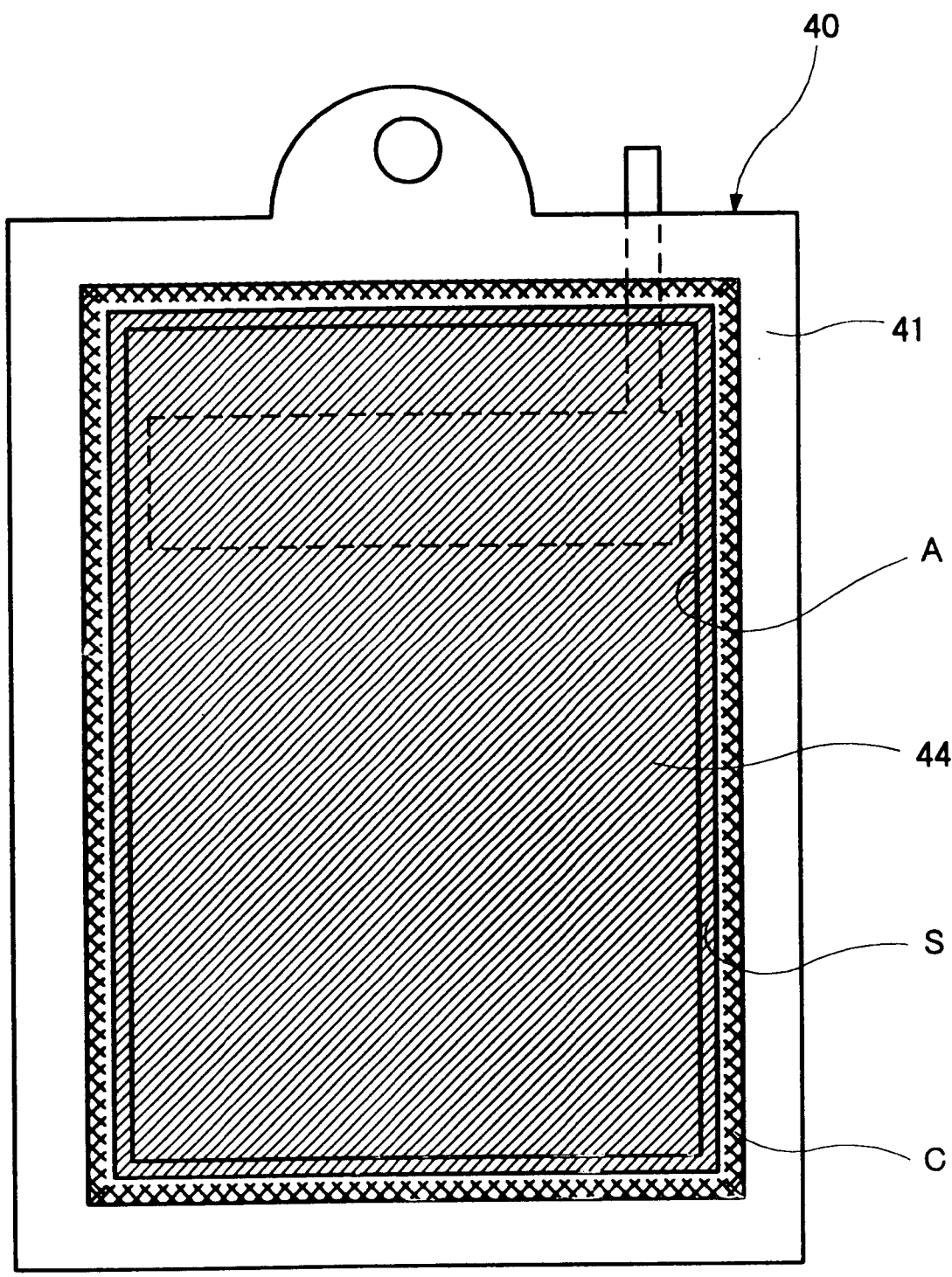
FIG. 1 is a schematic diagram of a membrane, cartridge according to one preferred embodiment of the present invention.

With the above fusing procedure, as shown in FIG. 1, a linear inner fixing portion A is formed at the inner linear welding allowance 42a, and a water sealing portion S is formed at the central linear welding allowance 42b, and an effective filtration area of the membrane 44 surrounded by the fused inner fixing portion A and water sealing portion S is retained under tension.

The outer fixing portion C disposed at the mesh-like welding allowance 43 intermittently fixes the periphery of the membrane 44 to the supporting plate 41. The inner fixing portion A, water sealing portion S and outer fixing portion C are so shaped that their respective trajectories are continuous through the entire periphery of the membrane 44. As a result, the membrane 44 is fused through its entire periphery to the supporting plate 41, thereby to accomplish a sealing function. Especially, the outer fixing portion C is sealed in multiple by three trajectories 43a, 43b and 43c. The outer fixing portion C is not necessarily required to have a sealing function, but it can be formed so as to have a discontinuous trajectory.

Operation of the above construction will be described hereinafter. A submerged membrane cartridge 40 is fit in a case 24 of a membrane unit 21, and it is submerged in an aeration tank and then used under the condition that an aeration is conducted from the bottom. In this state, a gas-liquid-solid mixed phase upward flow that is derived from the aeration will flow along the membrane surface. Therefore, vibration caused by the gas-liquid-solid mixed phase upward flow is exerted on the submerged membrane cartridge 40. In particular, a high load to be caused by the aeration upon termination of filtration, is exerted on the submerged membrane cartridge 40, and the repetitive stress due to this load is concentrated in the vicinity of the boundary between the membrane 44 and supporting plate 41 at the inner fixing portion A.

The service environment of the submerged membrane cartridge 40 in the aeration tank is varied depending on the shape of the aeration tank, the property of a liquid to be treated that is stored in the aeration tank, seasonal variable factors, and the like. Thus, depending on the change in the service environment, an eventual external force might exert on the submerged membrane cartridge 40.

The inner fixing portion A that retains the membrane 44 under tension, and the outer fixing portion C that fixes the periphery of the membrane 44 to the supporting plate 41, have a sufficient strength to an external force exerted on the membrane 44 in the usual service conditions. Therefore, any external force is received at the inner fixing portion A and the outer fixing portion C, thereby it is able to prevent the external force from reaching the water sealing portion S, and thus prevent damage to the water sealing portion S.

Since the inner fixing portion A and outer fixing portion C act as a protector against an external force, even when the membrane 44 peels at the inner fixing portion A or the outer fixing portion C, because of vibration fatigue and eventual external force, the water sealing portion S does not peel at the same time, and it is therefore able to prevent the filtration performance of the submerged membrane cartridge 40 from being damaged at an eventual circumstance. Thereby, the submerged membrane cartridge 40 has an improved durability against aeration.

When a peeling occurs at the inner fixing portion A or the outer fixing portion C, the former or later is repaired to recover its protecting function. This allows for the prevention of the peeling of the water sealing portion S, and permits to extend the life of the submerged membrane cartridge 40.

By shaping the outer fixing portion C like a mesh, the periphery of the membrane 44 is welded at the outer fixing portion C having a predetermined width. Therefore, the dimensional errors of the membrane 44 and the supporting plate 41 can be cancelled at the outer fixing portion C.

In the submerged membrane cartridge 40, the inner fixing portion A, water sealing portion S and outer fixing portion C accomplish a sealing function, thereby the sealing function is ensured in multiple.

Since a fusing layer F reaching the top surface of the membrane substrate 44*a* is formed by welding in the inner fixing portion A, water sealing portion S and outer fixing portion C, even when the membrane 44 peels at the inner fixing portion A and outer fixing portion C, due to vibration fatigue and eventual external force, the membrane 44 can maintain the function as a membrane. Specifically, before the membrane 44 is broken at the water sealing portion S, it comes off from the inner fixing portion A or outer fixing portion C, without causing a breakage of the membrane substrate 44*a*. Therefore, the life of the membrane cartridge 40 is extended by repairing the peeled inner fixing portion A or outer fixing portion C at the time of checking or the like.

Figure 5:
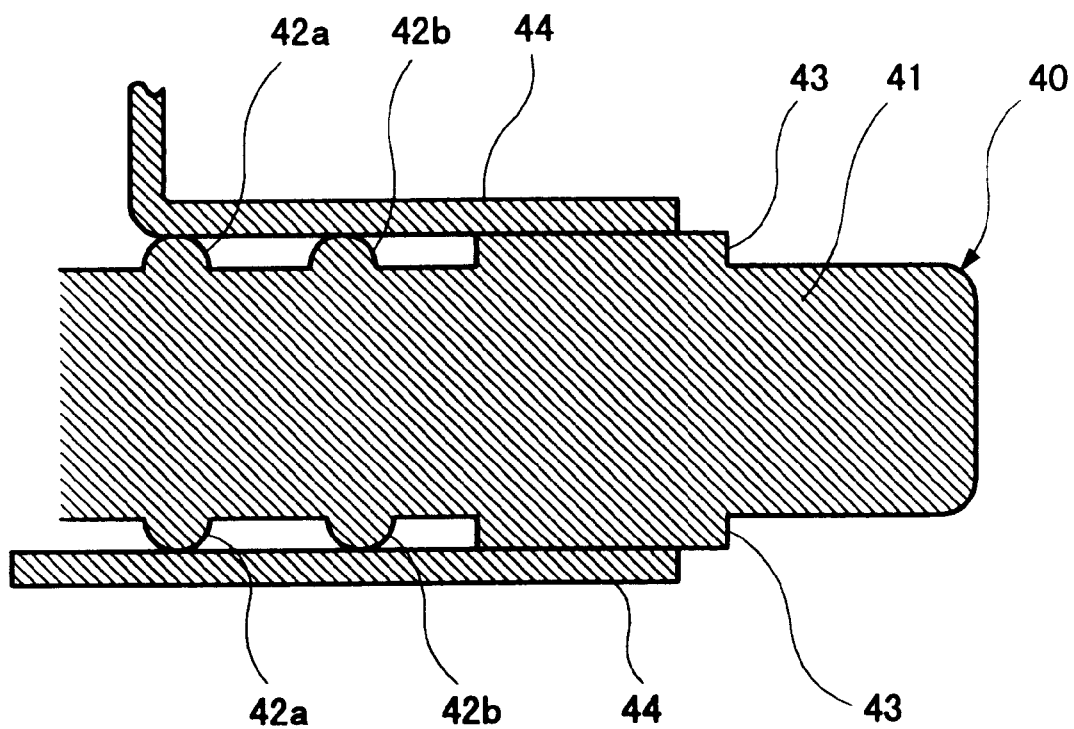
FIG. 5 is a schematic diagram illustrating a test procedure for testing the strength of welding.

A peeling test for the strength of welding will be described hereinafter. As shown in FIG. 5, the peeling test is conducted in the following manner that the membrane 44 fused to the supporting plate 41 (test specimens cut in a predetermined width) is vertically pulled with respect to the supporting plate 41.

Figure 6:
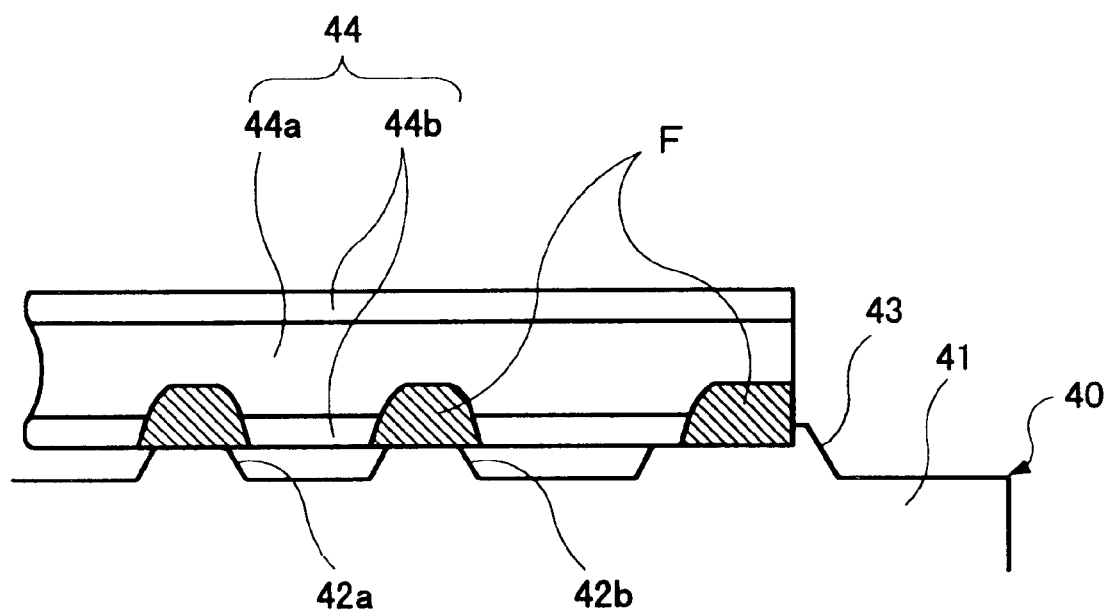
FIG. 6 is a schematic diagram illustrating a strong welded state of a membrane.
Figure 7:
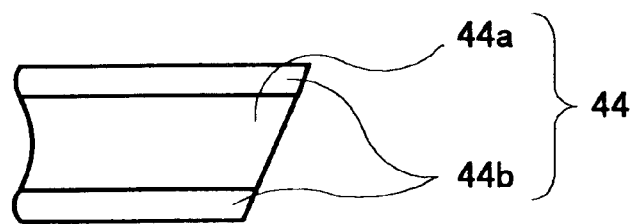
FIG. 7 is a schematic diagram illustrating a broken state of the membrane in a strongly welded state.
Figure 8:
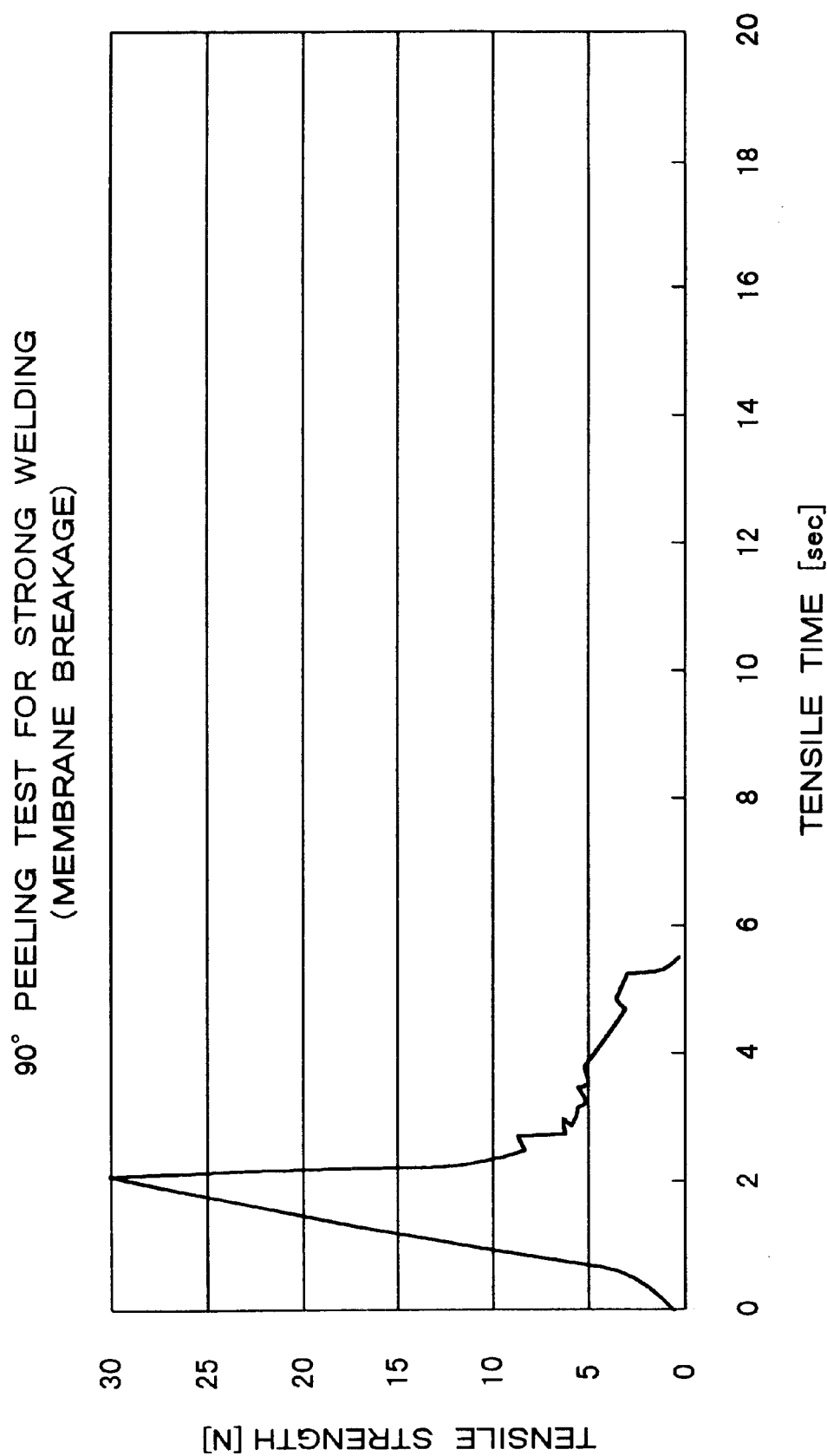
FIG. 8 is a diagram of a correlation between tensile strength and tensile time in a strongly welded state.

Referring to FIG. 6, when a fusing layer F that reaches a deep position in a membrane substrate 44*a* of the membrane 44 is formed in an inner fixing portion A, water sealing portion S and outer fixing portion C, the membrane 44 is broken at the inner fixing portion A, as shown in FIG. 7. In that event, the peak of strength is high, however, a rapid breakage takes place as is apparent from the correlation between tensile strength and tensile time in FIG. 8.

Thus, when the membrane 44 is strongly fused to the supporting plate 41 so as not to peel from the supporting plate 41, a thermal energy more than necessary is generated at a fusing part, thereby to deteriorate the membrane substrate 44*a* of the membrane 44. This reduces the life of the membrane cartridge 22.

Figure 9:
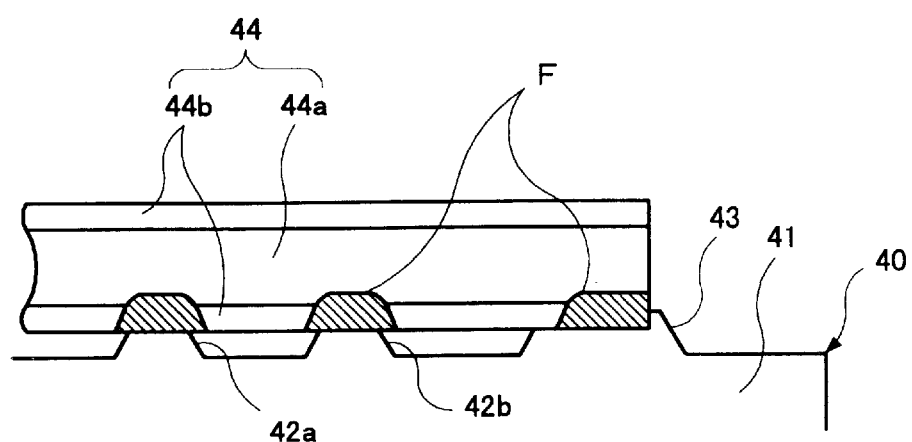
FIG. 9 is a schematic diagram illustrating a slightly strongly welded state of the membrane.
Figure 10:
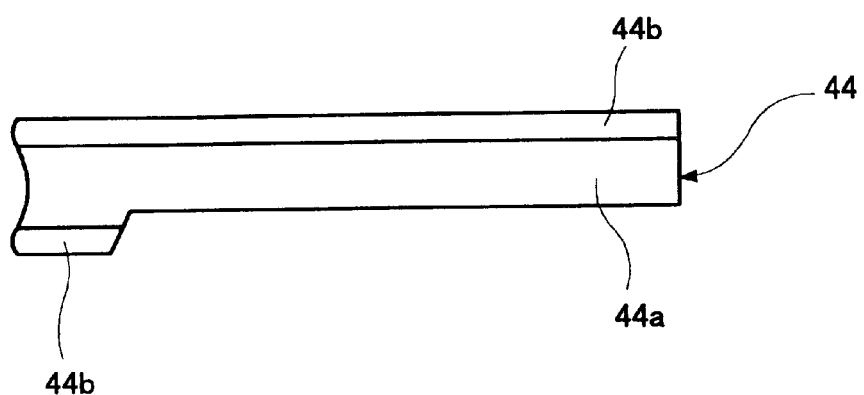
FIG. 10 is a schematic diagram illustrating a case that the membrane is peeled in a slightly strongly welded state.
Figure 11:
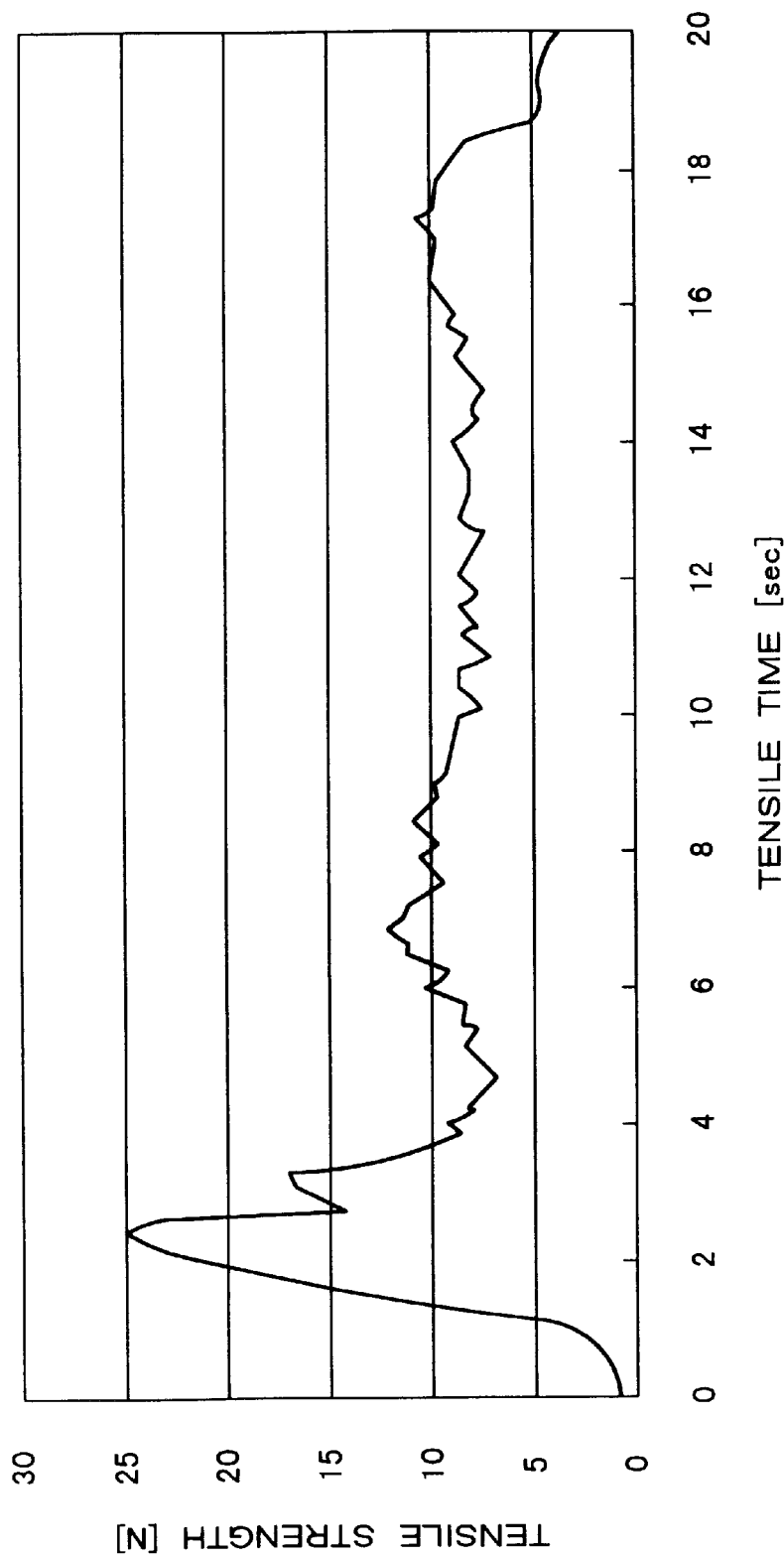
FIG. 11 is a diagram of a correlation between tensile strength and tensile time in a slightly strong welded state.

Referring to FIG. 9, when a fusing layer F that reaches a shallow position in a membrane substrate 44*a* of the membrane 44 is formed in an inner fixing portion A, water sealing portion S and outer fixing portion C, the membrane 44 is broken at the membrane substrate 44*a* as shown in FIG. 10. In that event, as is apparent from the correlation between tensile strength and tensile time in FIG. 11, the peak of strength is lower than the case of fusing strongly and, after the inner fixing portion A peels at the water sealing portion S and outer fixing portion C are successively broken and peel at the membrane substrate 44*a*, thus making it impossible to repair.

Figure 14:
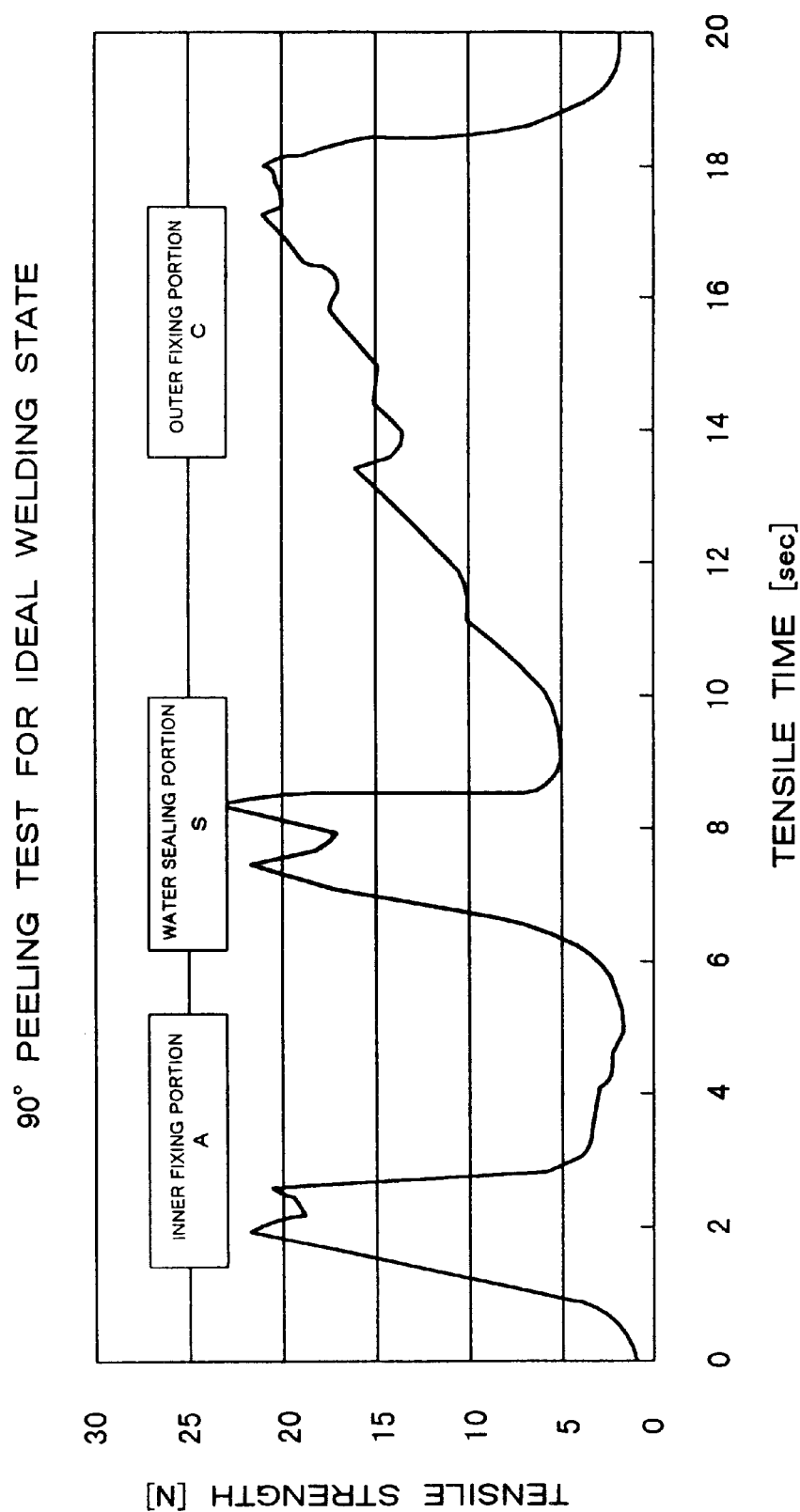
FIG. 14 is a diagram of a correlation between tensile strength and tensile time in an ideal welded state.

Referring to FIG. 12, when a fusing layer F reaching the top layer on the welding surface side of the membrane substrate 44*a* of the membrane 44, is formed by fusing in an inner fixing portion A, water sealing portion S and outer fixing portion C, the membrane 44 peels on the front surface on the welding side of the membrane substrate 44*a*. In that event, as is apparent from the correlation between tensile strength and tensile time in FIG. 14, the peak of strength is lower than the case of fusing strongly, however, a predetermined fusing strength is retained at the water sealing portion S even after the inner fixing portion A comes off. This enables to extend the life of the submerged membrane cartridge 40. Thus, in accordance with the present invention, the inner fixing portion that retains the membrane under tension state, and the outer fixing portion that fixes the periphery of the membrane to the supporting plate, act as a protector against an external force exerted to the membrane in the usual service conditions. Therefore, any external force cannot be exerted on the water sealing portion, thereby avoiding damage to the water sealing portion. Even if the membrane peels at the inner and outer fixing portions due to vibration fatigue and eventual external force, the water sealing portion does not peel at the same time, and the submerged membrane cartridge has an improved durability against aeration. In the event that a peeling occurs at the inner or outer fixing portion, the former or later is repaired to recover its protecting function for preventing the peeling of the water sealing portion, thereby extending the life of the submerged membrane. By shaping the outer fixing portion like a mesh, the dimensional errors of the membrane and the supporting plate can be cancelled in the outer fixing portion. The sealing function can be ensured in multiple by arranging so that the membrane is fused to the supporting plate through its entire periphery in the inner fixing portion, water sealing portion and outer fixing portion. By forming a fusing layer reaching the top layer of the membrane substrate of the membrane in the inner fixing portion, water sealing portion and outer fixing portion, the membrane peels from the inner and outer fixing portions, without causing a breakage of the membrane substrate. This facilitates to repair the membrane.

While the invention has been shown and described in detail, the foregoing description is in all aspects illustrative and not restrictive. It is therefore understood that numerous modifications and variations can be devised without departing from the scope of the invention.

What is claimed is:

1. A submerged membrane cartridge comprising a supporting plate made of a resin, and a membrane disposed so as to cover the surface of the supporting plate, characterized in that the membrane is fused in a plurality of welding allowances formed in multiple, along the periphery of the supporting plate; an inner fixing portion that retains the membrane under tension is formed by an inner welding allowance; a water sealing portion that ensures a sealing function through the entire periphery of the membrane is formed by a central welding allowance; and an outer fixing portion that fixes the periphery of the membrane to the supporting plate is formed by an outer welding allowance.

2. The submerged membrane cartridge according to claim 1, wherein the outer fixing portion is shaped like a mesh.

3. The submerged membrane cartridge according to claim 1 or 2, wherein the membrane is fused, through its entire periphery, to the supporting plate in the inner fixing portion, water sealing portion and outer fixing portion.

4. The submerged membrane cartridge according to any one of claims 1 to 3, wherein the membrane is formed by providing an organic membrane on the front and rear surfaces of a membrane substrate made of a nonwoven fabric, and a fusing layer reaching the top layer on the welding surface side of the membrane substrate is formed in the inner fixing portion, water sealing portion and outer fixing portion.

* * * * *